(12) United States Patent
Garcia et al.

(10) Patent No.: US 11,951,607 B1
(45) Date of Patent: Apr. 9, 2024

(54) ROBOTIC WAITER SYSTEM

(71) Applicants: Jose Ignacio Acitores Garcia, Madrid (ES); Andres Vallejo Cespedes, Madrid (ES)

(72) Inventors: Jose Ignacio Acitores Garcia, Madrid (ES); Andres Vallejo Cespedes, Madrid (ES)

(*) Notice: Subject to any disclaimer, the term of this patent is extended or adjusted under 35 U.S.C. 154(b) by 0 days.

(21) Appl. No.: 18/519,039

(22) Filed: Nov. 26, 2023

(51) Int. Cl.
*B25J 9/12* (2006.01)
*B25J 11/00* (2006.01)
*G06Q 30/02* (2023.01)
*G06Q 50/12* (2012.01)

(52) U.S. Cl.
CPC ............ *B25J 11/008* (2013.01); *B25J 9/126* (2013.01); *G06Q 30/0281* (2013.01); *G06Q 50/12* (2013.01)

(58) Field of Classification Search
CPC ..... B25J 9/126; B25J 11/008; G06Q 30/0281; G06Q 50/12
See application file for complete search history.

(56) References Cited

U.S. PATENT DOCUMENTS

| | | | | |
|---|---|---|---|---|
| 4,800,438 A | * | 1/1989 | Yuter | H04M 1/11 348/836 |
| 2004/0068441 A1 | * | 4/2004 | Werbitt | G06Q 30/0281 705/16 |
| 2016/0125558 A1 | * | 5/2016 | Clyburn | G06Q 30/0643 705/15 |
| 2018/0374169 A1 | * | 12/2018 | Videnovic | G06Q 20/321 |

* cited by examiner

*Primary Examiner* — Dale Moyer
(74) *Attorney, Agent, or Firm* — Ruben Alcoba, Esq.

(57) ABSTRACT

A robotic waiter system that is programmed to serve a patron at an eating establishment. The robotic waiter comprises of a base that supports a tablet. The base has a servomotor that spins the tablet toward a patron that is placing an order. The servomotor is controlled by a microprocessor that is programmed to spin a display toward the source of the sound. The sound is captured by a trio of acoustic sensors that are mounted on a housing, the acoustic sensors are operatively connected to the microprocessor, and the microprocessor ensures that the display is directly aligned to the source of the sound.

11 Claims, 2 Drawing Sheets

ROBOTIC WAITER SYSTEM

BACKGROUND

The present invention is directed to a robotic waiter system that allows a patron to make an order at an eating establishment.

The robot of the robotic waiter system is programmed to allow a person ordering at a table to directly interact with the robot.

The robot interacts with the patron by always turning toward the user placing an order and acknowledging the user before the robot.

The robot also transmits to the user reaffirmations of the orders made to the robot.

The robot is programmed to display colors that will allow the user to take comfort that the robot is attentive to the order being made while also allowing a server to be notified that a patron needs assistance.

The robot is also programmed to display the menu to the patron and then to confirm the order made by the patron by either showing a picture of the item ordered or by confirming the order via a written text that is written on a display of the robot.

The robot is also programmed to monitor the patrons that are served at a table and to warn the establishment of when the patrons leave the table.

The robot also allows the patron to request a real server when a server is needed at the table.

Lastly, the robot is programmed to remember patrons and their likes when the patrons re-visit the establishment. This feature allows the patrons to feel that they are at an establishment that values their patronage.

The present invention addresses the need of having a robot that will better serve a patron at an eating establishment.

SUMMARY

The present invention is directed to a robotic waiter system that will serve a patron at an eating establishment.

The robotic waiter comprises of a base that supports a tablet. The base has a servomotor that spins the tablet toward a patron that is placing an order. The servomotor is controlled by a microprocessor that is programmed to spin a display toward the source of the sound. The sound is captured by a trio of acoustic sensors that are mounted on a housing, the acoustic sensors are operatively connected to the microprocessor, and the microprocessor ensures that the display is directly aligned to the source of the sound. In an embodiment of the present invention, the housing will also have light that will be operatively connected to the microprocessor that will light up when a patron requests a waiter. In another embodiment the housing will have a speaker that will be operatively connected to the tablet that will transmit the sound output of a tablet.

A further embodiment of the present invention will have an ultrasonic sensor that will be operatively connected to the system of the present invention. The ultrasonic sensor will alert the eating establishment when patrons are no longer sitting at a table.

An object of the present invention is to provide a robotic waiter system that will allow an eating establishment to provide a virtual waiter.

Another object of the present invention is to provide a robotic waiter system that will allow an establishment the ability to take accurate orders.

Yet another object of the present invention is to provide a robotic waiter system that will allow an eating establishment to have an anti-theft system at each table.

Still another object of the present invention is to provide a robotic waiter system that can process payments without offending the patrons of the establishment.

BRIEF DESCRIPTION OF THE DRAWINGS

These and other features, aspects, and advantages of the present invention will become better understood with regards to the following description, appended claims, and drawings where:

DESCRIPTION

Figure 1:
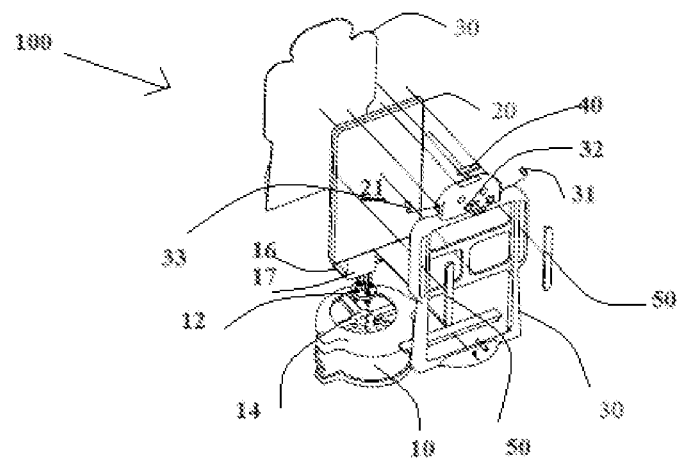
FIG. 1 is a front exploded perspective view of the present invention.
Figure 2:
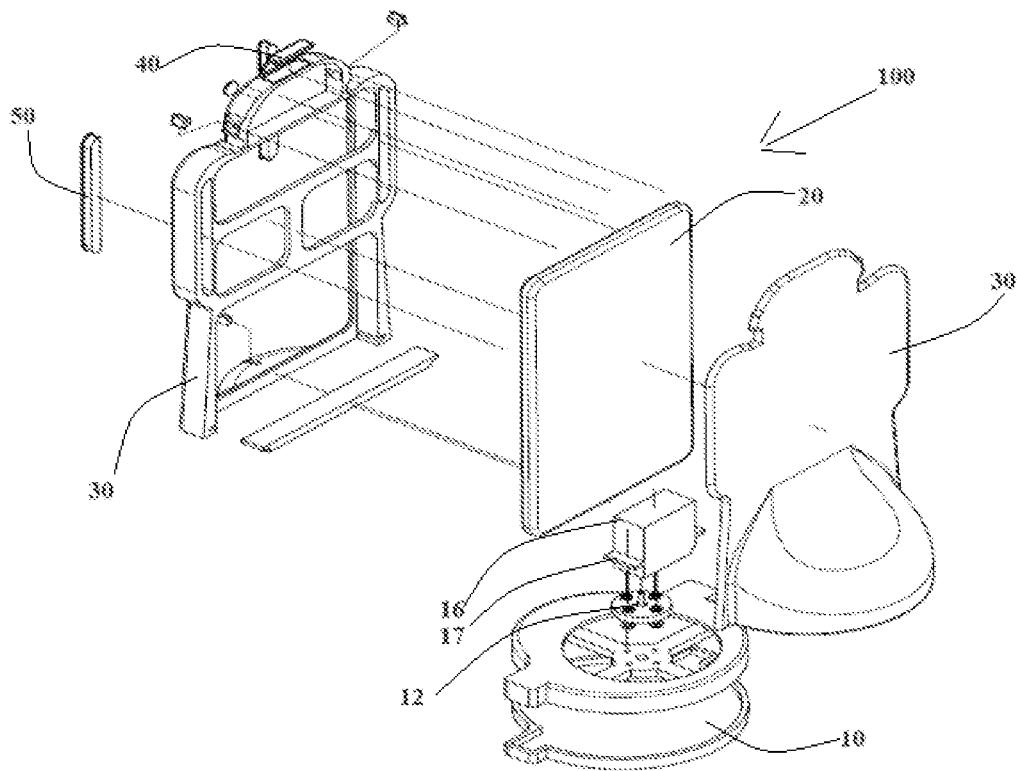
FIG. 2 is a rear exploded perspective view of the present invention.
Figure 3:
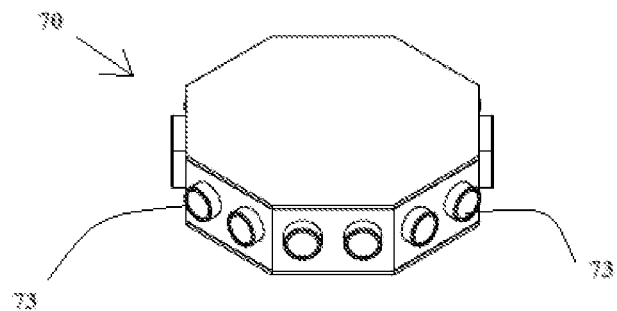
FIG. 3 is a perspective view of the ultrasonic device of the present invention.
Figure 4:
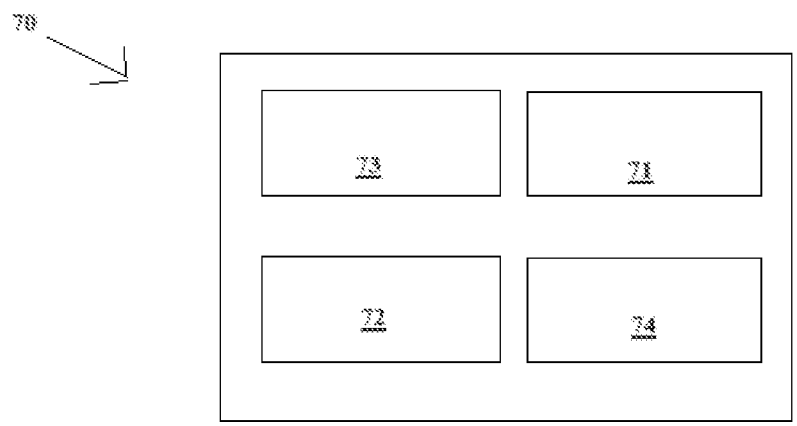
FIG. 4 is a block diagram that depicts the elements of the ultrasonic device.

As seen in FIGS. 1-4, the present invention is directed to a robotic waiter system 100 that is used at eating establishments. The robotic waiter system 100 comprises a base 10 has a servomotor 12 that is powered by a power source 14, the servomotor 12 is configured to spin a tablet 20 toward the patron that is placing an order, the base 10 is configured to be placed in a central location of a table that is in the eating establishment. A microprocessor 16 that is operatively connected to the servomotor 12, the microprocessor 16 has a transceiver 17, the microprocessor 16 is programmed to identify a source of an audio signal and to center a display 21 of the tablet 20 toward the audio signal. A housing 30 that is mounted on the servomotor 12, the housing 30 houses the tablet 20, the housing 30 has a left acoustic sensor 31, a middle acoustic sensor 32, and a right acoustic sensor 33 that are operatively connected to the microprocessor 16, the left acoustic sensor 31, the middle acoustic sensor 32, and the right acoustic sensor 33 transmit the audio signal to the microprocessor 16 and the microprocessor 16 uses the audio signal to direct the servomotor 12 to move the housing 30 so that the display 21 of the tablet 20 is directly aligned to the source of the audio signal. And, the tablet 20 that is secured within the housing 30, the tablet 20 is programmed to provide the patron with a visual menu, to communicate with the patron, to allow a patron to visually review an order, to wirelessly request service from the establishment, and to accept a payment from the patron.

In an embodiment of the present invention, the robotic waiter system comprises 100 a light 40 that is placed on the housing 30, the light 40 is operative connected to the tablet 20 and is configured to light up when the patron requires to speak to a server.

In another embodiment of the present invention, the robotic waiter system 100 comprises of at least one speaker 50 that is operatively connected to the tablet 20, the at least one speaker 50 is configured to reproduce a sound that is transmitted from the tablet 20.

In a preferred embodiment, the robotic waiter system 100 comprises of a patron detecting device 70 that is placed on the table, the patron detective device 70 comprises of a second microprocessor 71, a transceiver 72, a plurality of ultrasonic sensors 73, and a power source 74, the second microprocessor 71, the transceiver 72, the plurality of ultrasonic sensors 73, and the power source 74 are operatively connected, the second microprocessor 71 is programmed to receive ultrasonic signals from the plurality of ultrasonic sensors 73 that detect patrons that sit at the table and to warn the eating establishment of when the patrons leave the table.

In another preferred embodiment, the robotic waiter system comprises 100 a central processor 80 that communicates with the tablet 20 and/or with the patron detecting device 70.

It is foreseen that the present invention can be used at hotels, movie theaters, nightclubs, and transportation vehicles.

The tablet has a patron voice detection system that allows the patron to send information via speech-to-text to a display of the establishment or to a smartphone of a waiter.

An advantage of the present invention is that it provides a robotic waiter system that allows an eating establishment to provide a virtual waiter.

Another advantage of the present invention is that it provides a robotic waiter system that allows an establishment the ability to take accurate orders.

Yet another advantage of the present invention is that it provides a robotic waiter system that allows an eating establishment to have an anti-theft system at each table.

Still another advantage of the present invention is that it provides a robotic waiter system that processes payments without offending the patrons of the establishment.

The embodiments of the robotic waiter system herein are exemplary and numerous modifications, combinations, variations, and rearrangements can be readily envisioned to achieve an equivalent result, all of which are intended to be embraced within the scope of the appended claims. Further, nothing in the above-provided discussions of the robotic waiter system should be construed as limiting the invention to an embodiment or a combination of embodiments. The scope of the invention is defined by the description, drawings, and claims.

What is claimed is:

1. A robotic waiter system that is programmed to serve a patron at an eating establishment, the robotic waiter system comprises:
    a base has a servomotor that is powered by a power source, the servomotor is configured to spin a tablet toward the patron that is placing an order, the base is configured to be placed in a central location of a table that is in the eating establishment;
    a microprocessor that is operatively connected to the servomotor, the microprocessor has a transceiver, the microprocessor is programmed to identify a source of an audio signal and to center a display of the tablet toward the audio signal;
    a housing that is mounted on the servomotor, the housing houses the tablet, the housing has a left acoustic sensor, a middle acoustic sensor, and a right acoustic sensor that are operatively connected to the microprocessor, the left acoustic sensor, the middle acoustic sensor, and the right acoustic sensor transmit the audio signal to the microprocessor and the microprocessor uses the audio signal to direct the servomotor to move the housing so that the display of the tablet is directly aligned to the source of the audio signal; and
    the tablet that is secured within the housing, the tablet is programmed to provide the patron with a visual menu, to communicate with the patron, to allow a patron to visually review an order, to wirelessly request service from the establishment, and to accept a payment from the patron.

2. The robotic waiter system that is programmed to serve the patron at the eating establishment of claim 1, the robotic waiter system comprises a light that is placed on the housing, the light is operative connected to the tablet and is configured to light up when the patron requires to speak to a server.

3. The robotic waiter system that is programmed to serve the patron at the eating establishment of claim 2, the robotic waiter system comprises of at least one speaker that is operatively connected to the tablet, the at least one speaker is configured to reproduce a sound that is transmitted from the tablet.

4. The robotic waiter system that is programmed to serve the patron at the eating establishment of claim 3, the robotic waiter system comprises of a patron detecting device that is placed on the table, the patron detective device comprises of a second microprocessor, a transceiver, a plurality of ultrasonic sensors, and a power source, the second microprocessor, the transceiver, the plurality of ultrasonic sensors, and the power source are operatively connected, the second microprocessor is programmed to receive ultrasonic signals from the plurality of ultrasonic sensors that detect patrons that sit at the table and to warn the eating establishment of when the patrons leave the table.

5. The robotic waiter system that is programmed to serve the patron at the eating establishment of claim 4, the robotic waiter system comprises a central processor that communicates with the tablet and with the patron detecting device.

6. The robotic waiter system that is programmed to serve the patron at the eating establishment of claim 1, the robotic waiter system comprises a central processor that communicates with the tablet and with the patron detecting device.

7. The robotic waiter system that is programmed to serve the patron at the eating establishment of claim 6, the robotic waiter system comprises a light that is placed on the housing, the light is operative connected to the tablet and is configured to light up when the patron requires to speak to a server.

8. The robotic waiter system that is programmed to serve the patron at the eating establishment of claim 7, the robotic waiter system comprises of at least one speaker that is operatively connected to the tablet, the at least one speaker is configured to reproduce a sound that is transmitted from the tablet.

9. The robotic waiter system that is programmed to serve the patron at the eating establishment of claim 1, the robotic waiter system comprises a patron detecting device that is placed on the table, the patron detective device comprises of a second microprocessor, a transceiver, a plurality of ultrasonic sensors, and a power source, the second microprocessor, the transceiver, the plurality of ultrasonic sensors, and the power source are operatively connected, the second microprocessor is programmed to receive ultrasonic signals from the plurality of ultrasonic sensors that detect patrons that sit at the table and to warn the eating establishment of when the patrons leave the table.

10. The robotic waiter system that is programmed to serve the patron at the eating establishment of claim 9, the robotic waiter system comprises a central processor that communicates with the tablet and with the patron detecting device.

11. The robotic waiter system that is programmed to serve the patron at the eating establishment of claim 1, wherein the tablet has a patron voice detection system that allows the patron to send information via speech-to-text to a display of the establishment or to a smartphone of a waiter.

\* \* \* \* \*